United States Patent [19]
Gifford et al.

[11] Patent Number: 5,483,397
[45] Date of Patent: Jan. 9, 1996

[54] DAMPING CONFIGURATION FOR IMPROVED DISK DRIVE PERFORMANCE

[75] Inventors: R. Bruce Gifford, Nashua, N.H.; Michael C. Strzepa, Westboro; Tom E. MacDonald, Mansfield, both of Mass.; Frank W. Bernett, Colorado Springs, Colo.

[73] Assignee: Quantum Corporation, Milpitas, Calif.

[21] Appl. No.: 267,058

[22] Filed: Jun. 28, 1994

[51] Int. Cl.⁶ ................................................. G11B 33/14
[52] U.S. Cl. ................................. 360/97.01; 360/97.02
[58] Field of Search .............................. 360/97.01, 97.02, 360/97.03, 98.01, 98.02, 98.03, 98.07, 99.08; 310/51, 67 R, 90, 91

[56] References Cited

U.S. PATENT DOCUMENTS

| | | | |
|---|---|---|---|
| 4,855,857 | 8/1989 | Ono et al. | 360/97.01 |
| 4,905,110 | 2/1990 | Krum et al. | 360/99.08 |
| 4,942,219 | 7/1990 | Yatsuka et al. | 528/272 |
| 5,183,863 | 2/1993 | Nakamura et al. | 525/438 |
| 5,204,567 | 4/1993 | Kinoshita et al. | 310/51 |
| 5,214,549 | 5/1993 | Baker et al. | 360/97.02 |
| 5,270,887 | 12/1993 | Edwards et al. | 360/97.03 |
| 5,365,388 | 11/1994 | Maughan et al. | 360/97.01 |
| 5,430,589 | 7/1995 | Moir et al. | 360/97.02 |

Primary Examiner—John H. Wolff
Assistant Examiner—David L. Ometz
Attorney, Agent, or Firm—David B. Harrison

[57] ABSTRACT

A disk drive having attenuated vibrations for improved disk drive performance. The disk drive has first and second viscoelastic dampers effective in attenuating vibrations during operation of the disk drive.

10 Claims, 6 Drawing Sheets

DAMPING CONFIGURATION FOR IMPROVED DISK DRIVE PERFORMANCE

BACKGROUND OF THE INVENTION

The invention relates to data storage disk drives, and particularly to the control of the magnitude of vibrations generated and transmitted by the components of a disk drive at rocking mode and diaphragm mode resonant frequencies during operation of the disk drive.

Disk drives are used in computer applications for the high volume storage of data. Modern hard disk drives contain a disk assembly mounted within a disk enclosure or housing. The assembly includes a special head arrangement for transferring data to and from circular tracks disposed concentrically on multiple disk surfaces while the disks are rotated on a spindle mechanism at a predetermined speed. The disk enclosure containing the disks and the actuator with head-arm assemblies is also known as the head-disk assembly (HDA).

In a typical hard disk drive spindle arrangement, the disks are clamped to a bearing-mounted spindle hub which can rotate about an inner stationary spindle shaft. The disk drive spindle arrangement with mounted disks is referred to as the spindle-disk assembly (SDA). A motor mounted within the hub rotates the hub and disks. The motor is typically of the brushless DC type, consisting of a stator fixedly attached to the spindle shaft and a permanent magnet ring fixedly attached to the hub so that energization of the stator causes the hub, and thus the disks, to rotate.

The SDA of a disk drive has essentially three major modes of vibration: disk and hub vibrations in a radial direction relative to the spindle shaft; disk and hub vibrations in an axial direction relative to the spindle shaft; and a rocking (or wobbling) displacement of the disk and hub relative to the spindle shaft. The SDA (specifically the disks and the hub) exhibits the aforementioned modes of vibration as a result of the following types of excitations: 1) spindle generated vibrations such as "ball bearing ball pass" and "ball spin" during normal operation, 2) environmental vibrations and shocks, and 3) vertical diaphragm mode vibrations of the HDA that are transferred to the SDA. Diaphragm mode vibrations are vertical drum-like deformations of both the top cover and the bottom base plate of a disk enclosure/HDA.

Prior art disk drives have precision spindle assemblies with rigid shafts mounted directly to very rigid housings. These disk drives, because of their mechanical structure, offer minimal damping to attenuate the effects of spindle rocking mode and vertical diaphragm mode resonances caused by environmental shocks and vibrations, and spindle generated excitations during normal operation. Some of the vibrational energy transmitted to the SDA coincides with its inherent resonant frequencies, causing servo system errors and track misregistration thereby resulting in decreased drive performance. Further, due to the smaller height and closer spacing between spindle bearings, low profile disk drives have lower resonance frequencies for the SDA rocking modes thereby experiencing performance problems at lower frequencies of excitations.

The mechanical structure of an SDA has a significant effect on the amplitude of vibrations experienced by it at spindle rocking mode and vertical diaphragm mode resonant frequencies. Undamped, rigid mechanical structures have lower resonant frequencies than damped structures having the same effective stiffness. They also exhibit vibrations of higher amplitude at resonant frequencies. Therefore, an undamped and rigid SDA attains its structural resonance frequencies at lower levels of excitation and also experiences large vibrations at its resonance frequencies. These vibrations cause the servo system to fail resulting in both write-to-write and write-to-read track misregistration. Therefore, the mechanical structure of an SDA has a significant effect upon the capability of a storage system to support high track and bit densities and upon its performance characteristics.

Therefore, there is a need for dynamically stable disk drives having additional internal damping to reduce the amplitude of vibrations experienced by the SDA at spindle rocking mode and vertical diaphragm mode resonant frequencies caused by environmental shocks and vibrations, and spindle generated excitations during normal operation.

Further, low acoustic noise is an increasingly important performance advantage in the hard disk drive market; particularly, for example, for hard drives designed to operate in personal computers for use in relatively quiet environments. It has been found that a major source of acoustic noise is the excitation of SDA during normal operation.

Therefore, there is also a need for quieter hard disk drives having damping for improved acoustic performance.

SUMMARY OF THE INVENTION

The present invention is a disk drive having attenuated vibrations during operation.

An object of the invention is to enhance internal damping of the disk drive to reduce the amplitude of forward and reverse whirl rocking mode vibrations and diaphragm mode vibrations experienced by the SDA during operation of the disk drive.

Another object of the invention is to decrease acoustic noise output to improve acoustic performance of the disk drive.

Yet another object of the invention is to reduce the amplitude of vibrations experienced by the SDA due to environmental shocks and vibrations.

These and other objects are attained, in one sense, through the use of a disk drive comprising a disk enclosure. The disk enclosure has a top cover and a bottom baseplate. The disk drive also has spindle shaft disposed within the enclosure. The shaft has a top and a bottom. The disk drive further comprises a viscoelastic damper positioned within the enclosure in contact with the top cover of the disk enclosure and the top of the spindle shaft. The viscoelastic damper is effective to attenuate vibrations during operation of the disk drive.

The objects of the invention are attained, in another sense, through the use of a disk drive comprising a disk enclosure. The disk enclosure has a top cover and a bottom baseplate; the top cover and the bottom baseplate each has an inner surface and an outer surface. The disk drive also comprises a spindle shaft within the enclosure having a top and a bottom. The disk drive also has a module board. The disk drive further comprises a viscoelastic damper positioned outside the enclosure in contact with the outer surface of the bottom baseplate outside the disk enclosure and the module board. The viscoelastic damper is effective to attenuate vibrations during operation of the disk drive.

The objects of the invention are attained, in a more specific sense, through the use of a disk drive comprising a disk enclosure. The disk enclosure has a top cover and a bottom baseplate; the; top cover and the bottom baseplate each has an inner surface and an outer surface. The disk drive also comprises a spindle shaft having a top and a bottom and disposed generally perpendicularly within the enclosure. The disk drive also has a module board. The disk drive further comprises a first viscoelastic damper positioned within the enclosure in contact with the top cover of the disk enclosure and the top of the spindle shaft. The first viscoelastic damper further comprises a washer with a raised central portion. The damper has a layer of viscoelastic material fixed to one side of the washer. The viscoelastic material is effective to attach the washer to the top cover of the disk enclosure. The washer also has an opening therethrough at the raised central region to provide access for the attachment of the top cover and the shaft. The disk drive further comprises a second viscoelastic damper positioned outside the enclosure in contact with the outer surface of the bottom baseplate outside the disk enclosure and the module board. The second viscoelastic damper comprises a first and second viscoelastic layer. The damper further having a polyester layer disposed between the first and second viscoelastic layers. The first and second viscoelastic dampers are effective to attenuate vibrations during operation of the disk drive.

It is an advantage of this invention that disk drive robustness to environmental shocks and vibrations is improved due to increased internal damping of the disk drive.

It is another advantage of this invention that servo system performance is enhanced.

It is yet another advantage of this invention that acoustic performance of the disk drive is improved.

The foregoing and additional objects, features and advantages of the present invention will become apparent to those skilled in the art from a more detailed consideration of the embodiments thereof, taken in conjunction with the accompanying drawings.

DETAILED DESCRIPTION OF THE INVENTION

Figure 1:
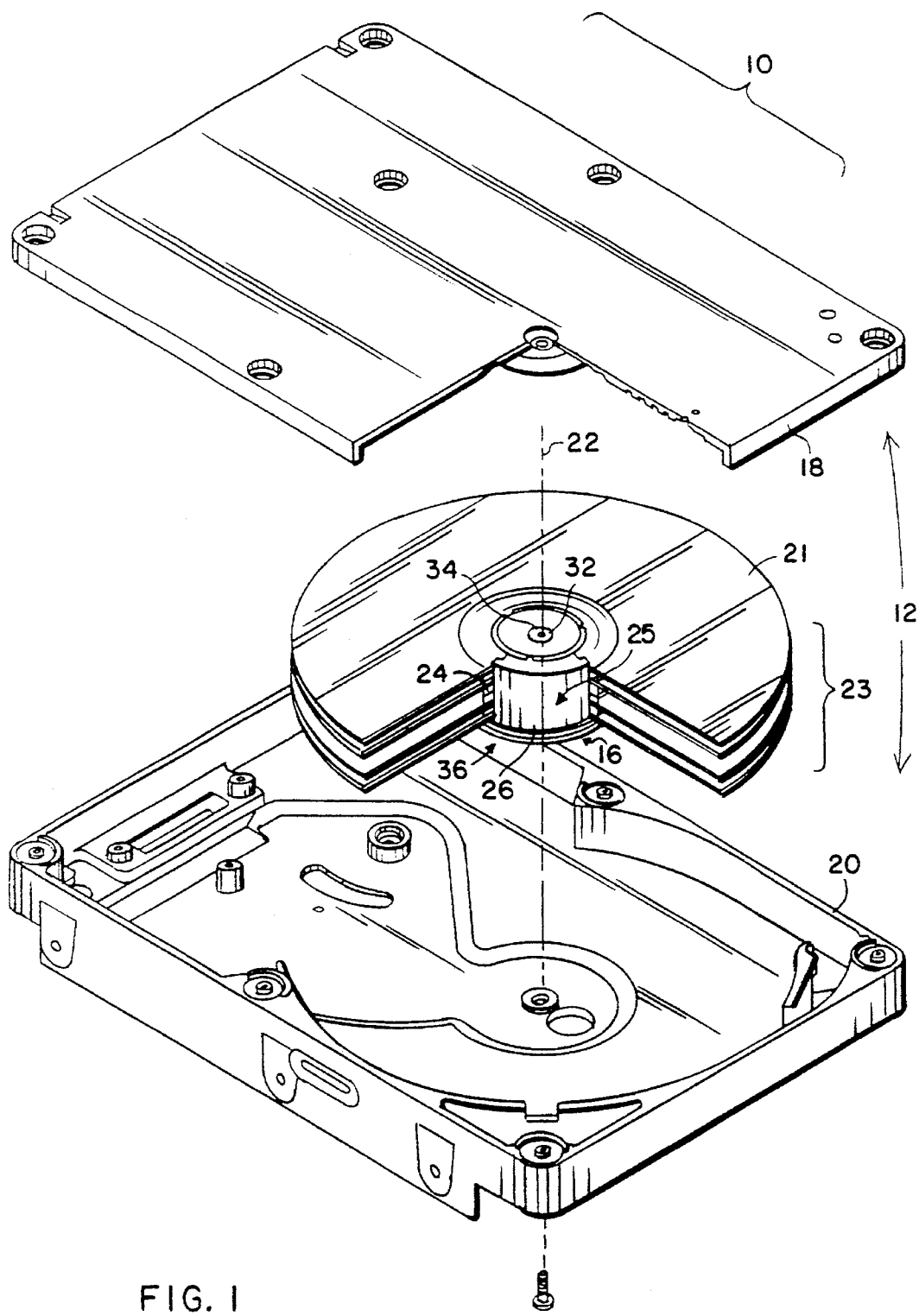
FIG. 1 is a perspective view of a disk drive having viscoelastic dampers, according to the principles of the invention.
Figure 2:
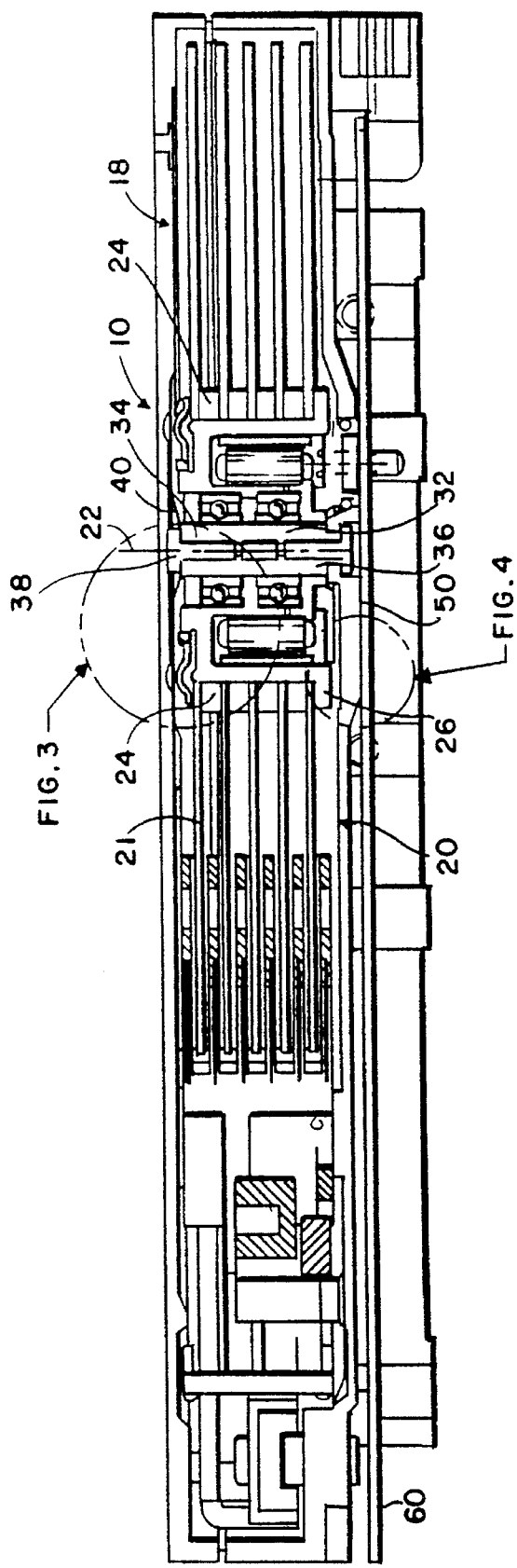
FIG. 2 is a detailed cross-sectional view of the disk drive of FIG. 1.

Referring to FIGS. 1 and 2, disk drive 10 includes a housing or enclosure 12 containing a spindle 16 secured to a top cover 18 and bottom baseplate 20. The spindle 16 supports disks 21 for rotation in the housing 12 about an axis 22. The individual disks 21 are separated by spacers 24 and are secured onto the outer surface 25 of a rotatable hub 26. A head assembly (not shown) is provided for reading information from and writing information onto disks 21 as they rotate with the hub 26. The disk drive spindle arrangement 16 with mounted disks 21 is referred to as the spindle-disk assembly (SDA) 23. The disk enclosure 12 containing the disks 21 and the actuator with head-arm assemblies is also known as the head-disk assembly (HDA).

Further, as shown in FIGS. 1 and 2, the spindle 16 includes the hub 26 mounted for rotation about an elongated, stainless steel, stationary spindle shaft 32. The top and the bottom 34 and 36 of the shaft 32 are rigidly mounted to the top cover 18 and bottom baseplate 20 respectively by screws, bolts, or the like. Cartridge bearing assemblies support the hub 26 on the shaft 32 to permit rotation of the hub 26 about the shaft 32.

Figure 3:
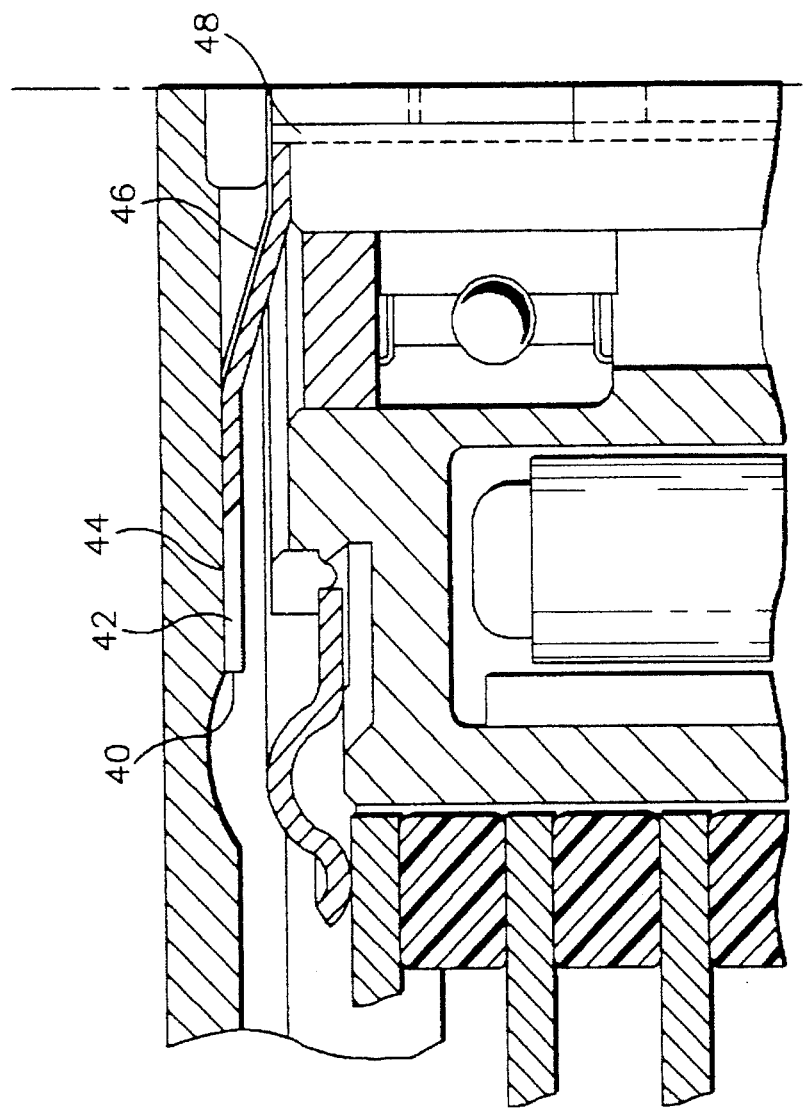
FIG. 3 is a cross-sectional view of the top cover region and the top cover damper of the disk drive of FIG. 1.
Figure 3A:
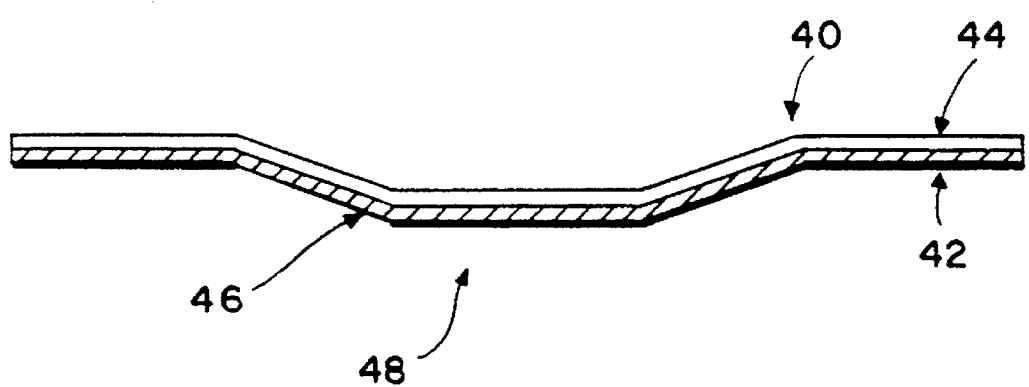
FIG. 3A is a detailed cross-sectional view of the top cover damper shown in FIG. 3.

Also, as shown in FIGS. 2 and 3, there is located a cover damper 40 positioned within the disk enclosure 12 in contact with the top cover 18 and the top of the spindle shaft 34. As shown in FIGS. 3 and 3A, the cover damper is comprised of a generally arcuate washer 42 with a raised central portion 46. As shown, the washer 42 is partially conical in shape.

Also as shown, the cover damper 40 has a layer 44 of viscoelastic material fixed to one side of the washer 42. The damper 40 is attached to the top cover 18 by means of the adhesive properties of the viscoelastic layer 44.

As shown in FIGS. 3 and 3A, according to the preferred embodiment, the damper 40 has an opening 48 at the central region 46. The opening 46 provides access to fixedly attach the top cover 18 and the damper 40 to the spindle shaft 32. Referring to FIGS. 2 and 3, the top cover 18 with the damper 40 attached to it is fastened to the spindle shaft 32 with a screw 38.

Referring to FIGS. 2, 3, and 3A, according to the preferred embodiment, for a 1.0 inch tall disk drive 10 having four disks 21, good results were obtained by using a top cover damper 40 having a 0.010 inch thick stainless steel conical washer 42 and a 0.002 inch thick layer 44 of viscoelastic material. Good performance results were obtained by using a 3M Corporation product, 3M SJ2015 SCOTCHDAMP, as the viscoelastic material for viscoelastic layer 44. A conical washer 42 was used to achieve the desired stiffness for the disk drive of FIG. 1. Other damper shapes and materials may also be used to provide the desired stiffnesses for other applications.

The cover damper 40 is effective in attenuating vibrations during operation of the disk drive 10. In a static condition, the SDA 23 has one rocking mode resonant frequency, denoted by Nf. However, when the SDA 23 is rotating at a frequency/rotational speed Rf, it exhibits two rocking mode resonant frequencies: the forward and reverse rocking mode resonant frequencies, denoted by Nf+Rf and Nf−Rf respectively. At the forward and reverse rocking mode resonant frequencies, the SDA 23 exhibits rocking mode resonances/vibrations. These rocking mode resonances are caused by environmental shocks and vibrations, by spindle motor operation, and by excitations transferred to the SDA 23 from the disk enclosure 12 at the HDA's diaphragm mode resonant frequency. The cover damper 40 reduces the amplitude of vibrations transmitted to the SDA 23 at forward and reverse rocking mode resonant frequencies and the diaphragm mode resonant frequency of the HDA.

Figure 4:
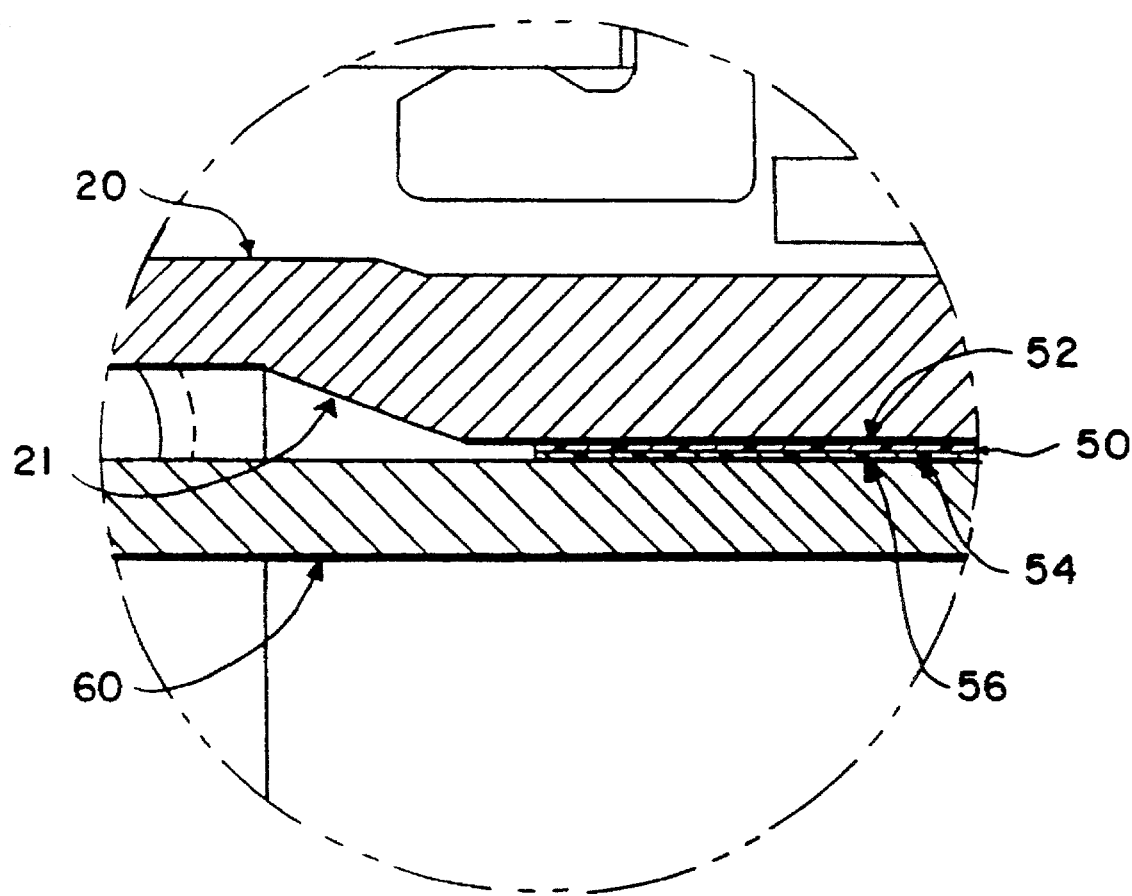
FIG. 4 is a cross-sectional view of the bottom baseplate region and the baseplate damper of the disk drive of FIG. 1.
Figure 4A:
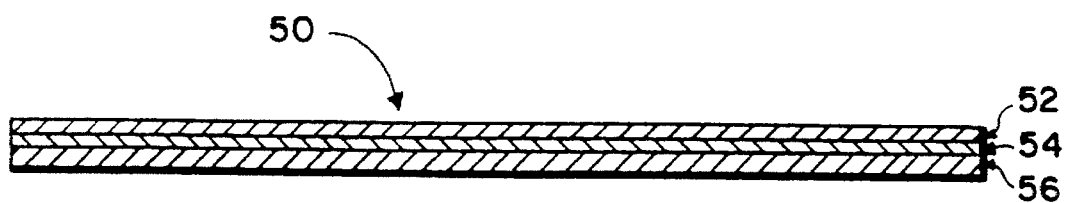
FIG. 4A is a detailed cross-sectional view of the baseplate damper of FIG. 4.
Figure 4B:
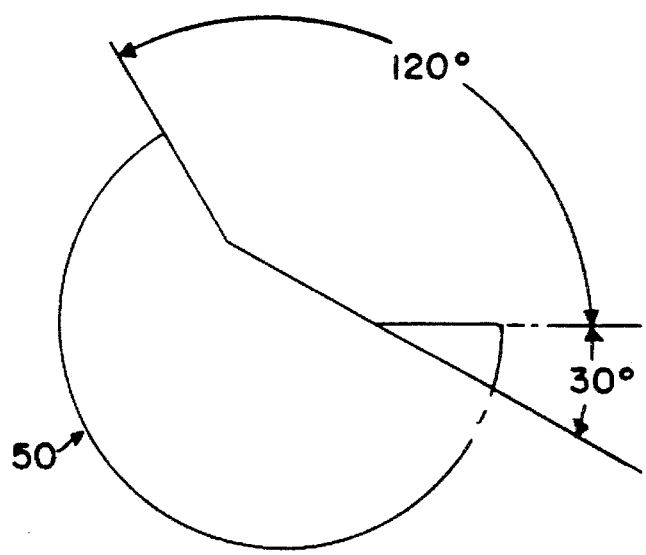
FIG. 4B is a top view of the baseplate damper of FIG. 4.

Further, as shown in FIGS. 2 and 4, there is located a baseplate damper 50 positioned outside the enclosure 12 in contact with the outer surface 21 of the bottom base plate 20 and the module board 60. As shown in FIGS. 4, 4A and 4B, the baseplate damper 50 is comprised of a first viscoelastic layer 52 and a second viscoelastic layer 56. As shown, disposed between the first and second viscoelastic layers 52 and 56 is a interleaving layer 54. The interleaving layer 54 is made of polyester.

Referring to FIGS. 2, 4, 4A and 4B, the baseplate damper 50 is attached to the outer surface 21 of the bottom baseplate 20 and the module board 60 by means of the adhesive properties of the first and second viscoelastic layers 52 and 56 respectively.

Further, as shown in FIGS. 4 and 4A, according to the preferred embodiment, good performance results were obtained by using a baseplate damper 50 having 0.005 inch thick first viscoelastic layer 52, a 0.005 inch thick second viscoelastic layers 56, and a 0.0014 inch thick polyester interleaving layer 54. Other thicknesses may also be used to achieve the stiffness required from the baseplate damper for other applications.

Further, as shown in FIG. 4B, according to the preferred embodiment, good performance results were obtained by using a baseplate damper 50 shaped as a notched disc. Other shapes may also be used to achieve similar good results.

The baseplate damper 50 is effective in attenuating vibrations during operation of the disk drive 10. Specifically, the disk drive 10 enclosure/HDA exhibits vertical diaphragm mode vibrations resulting from vibration excitation of the disk enclosure 12 and from relative shearing motion between the enclosure baseplate 20 and the module 60. Diaphragm mode vibrations get transferred to the SDA 23. The baseplate damper 50 attenuates SDA vibration amplitudes caused by HDA diaphragm mode vibrations of the disk enclosure.

While the invention has been particularly shown and described with reference to one embodiment thereof, it will be understood by those skilled in the art that various other changes in the form and details may be made therein without departing from the spirit and scope of the invention. The present disclosure is merely illustrative, the invention encompassing all variations thereof.

We claim:

1. A hard disk drive comprising:
   a disk enclosure having a top cover and a bottom baseplate;
   a spindle motor fixed to the baseplate and including a spindle shaft having a top and, a bottom, the spindle shaft disposed within the enclosure between the top cover and the bottom baseplate;
   a laminated viscoelastic damper positioned within the enclosure in contact with the top cover and the top of the spindle shaft, said damper comprising a generally arcuate metal washer having a raised central portion on a side thereof and a layer of viscoelastic material fixed to an opposite side thereof, wherein the raised central portion is secured to the top of the spindle shaft and wherein the layer of viscoelastic material is attached to the top cover to provide stiffness in reducing shaft vibrations.

2. The apparatus of claim 1 wherein said raised central portion is partially conical.

3. The apparatus of claim 1 wherein said washer has an opening therethrough at a central region, said opening providing access to fixedly attach said top cover and said damper to said spindle shaft.

4. The apparatus of claim 1 wherein said layer of viscoelastic material is an adhesive.

5. The hard disk drive of claim 1, wherein the top cover is a single-layer structure.

6. A hard disk drive comprising:
   a disk enclosure having a top cover and a bottom baseplate, said top cover and said bottom baseplate each having an inner surface and an outer surface;
   a spindle shaft having a top and a bottom, said shaft disposed within the enclosure between the top cover and the bottom baseplate;
   a module board;
   a laminated damper positioned within the enclosure and interconnecting the top cover and the top of the spindle shaft, said laminated damper comprising a generally arcuate metal washer having a raised central portion on a side thereof and a layer of viseoelastic material fixed to an opposite side thereof, wherein the raised central portion is secured to the top of the spindle shaft and wherein the layer of viseoelastic material is attached to the top cover to provide stiffness in reducing shaft vibrations; and
   a viscoelastic damper positioned outside the enclosure in contact with the outer surface of the bottom baseplate and the module board, said laminated damper and said viscoelastic damper being effective to attenuate vibrations during operation of said disk drive.

7. The apparatus of claim 6 wherein said viscoelastic damper comprises:
   first and second viscoelastic layers; and
   a polyester layer disposed between said first and second viscoelastic layers.

8. The hard disk drive of claim 6, wherein the top cover is a single-layer structure.

9. A hard disk drive comprising:
   a disk enclosure having a top cover and a bottom baseplate, said top cover and said bottom baseplate each having an inner surface and an outer surface;
   a spindle shaft having a top and a bottom, said shaft disposed generally perpendicularly within the enclosure between the top cover and the bottom baseplate;
   a module board;
   a laminated damper positioned within the enclosure in contact with the top cover and the top of the spindle shaft, said laminated damper comprising a generally arcuate metal washer with a raised central portion on a side thereof and a layer of viscoelastic material fixed to an opposite side thereof, wherein the raised central portion is secured to the top of the spindle shaft and wherein said viscoelastic material is attached to said top cover of said disk enclosure to provide stiffness in reducing shaft vibrations; and
   a viscoelastic damper positioned outside the enclosure in contact with the outer surface of the bottom baseplate and the module board, said viscoelastic damper comprising first and second viscoelastic layers and a polyester layer disposed between said first and second viscoelastic layers, said laminated damper and said viscoelastic damper being effective to attenuate vibrations during operation of said disk drive.

10. The hard disk drive of claim 9, wherein the top cover is a single-layer structure.

* * * * *